US012598592B2

(12) United States Patent
Kwok et al.

(10) Patent No.: US 12,598,592 B2
(45) Date of Patent: Apr. 7, 2026

(54) RESERVATION OF FDD FREQUENCIES FOR REDUCED CAPABILITY DEVICES

(71) Applicant: T-Mobile USA, Inc., Bellevue, WA (US)

(72) Inventors: Ming Shan Kwok, Seattle, WA (US); Wafik Abdel Shahid, Kenmore, WA (US); Egil Gronstad, Encinitas, CA (US); Alejandro Aguirre-Rivadeneyra, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 551 days.

(21) Appl. No.: 17/933,328

(22) Filed: Sep. 19, 2022

(65) Prior Publication Data

US 2024/0098718 A1      Mar. 21, 2024

(51) Int. Cl.
*H04W 72/0453* (2023.01)
*H04L 5/14* (2006.01)
*H04L 67/04* (2022.01)
*H04W 76/10* (2018.01)

(52) U.S. Cl.
CPC .......... *H04W 72/0453* (2013.01); *H04L 5/14* (2013.01); *H04L 67/04* (2013.01); *H04W 76/10* (2018.02)

(58) Field of Classification Search
CPC .. H04W 76/10; H04W 72/0453; H04L 67/04; H04L 5/14
See application file for complete search history.

(56) References Cited

U.S. PATENT DOCUMENTS

| | | | | |
|---|---|---|---|---|
| 2023/0189269 A1* | 6/2023 | Wang | .................... | H04W 72/12 |
| | | | | 370/329 |
| 2023/0189348 A1* | 6/2023 | Kim | .................. | H04W 74/0866 |
| | | | | 370/329 |
| 2023/0362787 A1* | 11/2023 | Ohlsson | ................ | H04W 48/18 |
| 2024/0187967 A1* | 6/2024 | He | ........................ | H04W 72/51 |

* cited by examiner

*Primary Examiner* — Brian D Nguyen
(74) *Attorney, Agent, or Firm* — Lee & Hayes, P.C.

(57) ABSTRACT

System and methods for connecting reduced capability (redcap) and frequency division duplex (FDD)-only mobile devices to FDD frequency bands of an access network are described. A mobile device may determine an indicator that the mobile device is a redcap or FDD-only device and provide mobile device capabilities, including the indicator, to an access network. The mobile device may then establish a connection to the access network via a radio antenna of the mobile device and using a frequency band associated with FDD by the access network. The access network may receive the mobile device capabilities and, based at least in part on the mobile device capabilities, steer the mobile device to a frequency band associated with FDD.

19 Claims, 5 Drawing Sheets

200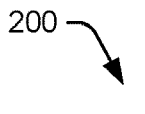

202 ──

> CAMP ON FDD FREQUENCY BAND WHILE IN IDLE MODE

204 ──

> DETERMINE AN INDICATOR THAT THE DEVICE IS A REDUCED CAPABILITY (REDCAP) DEVICE OR FDD-ONLY DEVICE
>
> 206 ──
> > DETERMINE A FLAG INDICATING FDD-ONLY EVEN IF DEVICE HAS TDD AND FDD
>
> DETERMINE A LIST OF ONLY FDD BANDS EVEN IF DEVICE SUPPORTS FDD AND TDD BANDS ── 208
>
> 210 ──
> > INDICATE THAT DEVICE IS A REDCAP DEVICE OR IS USING REDCAP APP.

212 ──

> PROVIDE DEVICE CAPABILITIES, INCLUDING THE INDICATOR, TO AN ACCESS NETWORK

214 ──

> ESTABLISH CONNECTION TO ACCESS NETWORK VIA FDD RADIO ANTENNA OF DEVICE USING FDD FREQUENCY BAND
>
> 216 ──
> > ESTABLISH CONNECTION USING FDD BAND WHEN NOT CONGESTED
>
> ESTABLISH CONNECTION USING TDD BAND WHEN FDD BAND IS CONGESTED ── 218

FIG. 2

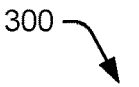

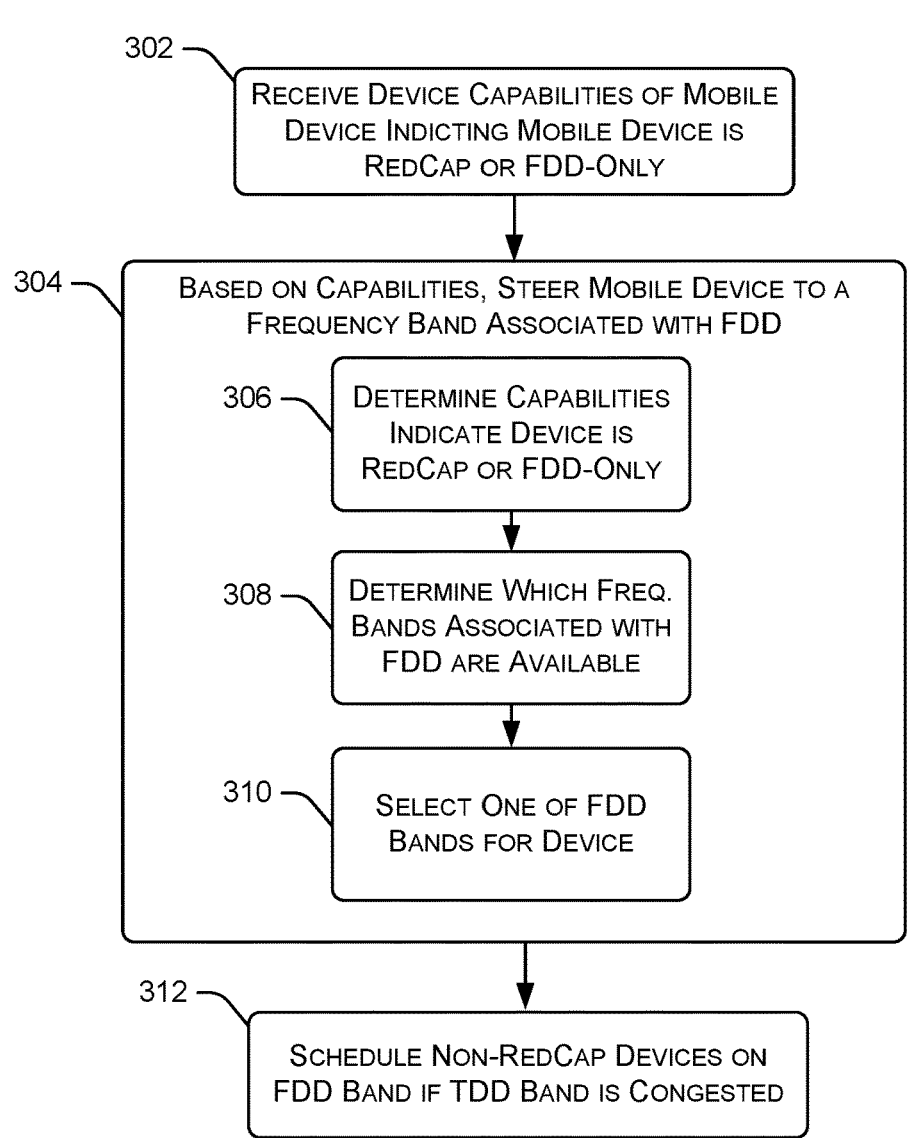

302

RECEIVE DEVICE CAPABILITIES OF MOBILE DEVICE INDICTING MOBILE DEVICE IS REDCAP OR FDD-ONLY

304

BASED ON CAPABILITIES, STEER MOBILE DEVICE TO A FREQUENCY BAND ASSOCIATED WITH FDD

306

DETERMINE CAPABILITIES INDICATE DEVICE IS REDCAP OR FDD-ONLY

308

DETERMINE WHICH FREQ. BANDS ASSOCIATED WITH FDD ARE AVAILABLE

310

SELECT ONE OF FDD BANDS FOR DEVICE

312

SCHEDULE NON-REDCAP DEVICES ON FDD BAND IF TDD BAND IS CONGESTED

FIG. 3

RESERVATION OF FDD FREQUENCIES FOR REDUCED CAPABILITY DEVICES

BACKGROUND

An ever-increasing number of devices are connecting to and use radio frequency resources. Some of these devices connect indirectly—e.g., through another mobile device—but more and more, devices are including radio antenna(s) allowing them to connect directly to various access networks. Such devices may have various form factors, including watches, augmented reality/virtual reality glasses/goggle/headsets, headphones, etc. To enable longer battery life for these devices, reducing power-intensive components of the devices is important. The Third Generation Partnership Project (3GPP) release 17 addresses these issues by defining "reduced capability" (redcap) devices. The 3GPP specification for these redcap devices focuses on limiting the maximum bandwidth and number of transmit and receive radio antenna(s) on the devices. The specification contemplates that redcap devices will support radio antenna(s) configured for both frequency division duplex (FDD) and time division duplex (TDD) transmission using FDD and TDD frequencies.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2 is a flow diagram of an illustrative process for determining an indicator that a mobile device is a redcap device or is an FDD-only device, providing that indicator to an access network, and establishing a connection to the access network via an FDD frequency band.

FIG. 3 is another flow diagram of an illustrative process for receiving an indicator that a mobile device is a redcap device or an FDD-only device and steering that mobile device to an FDD frequency band.

DETAILED DESCRIPTION

Figure 1:
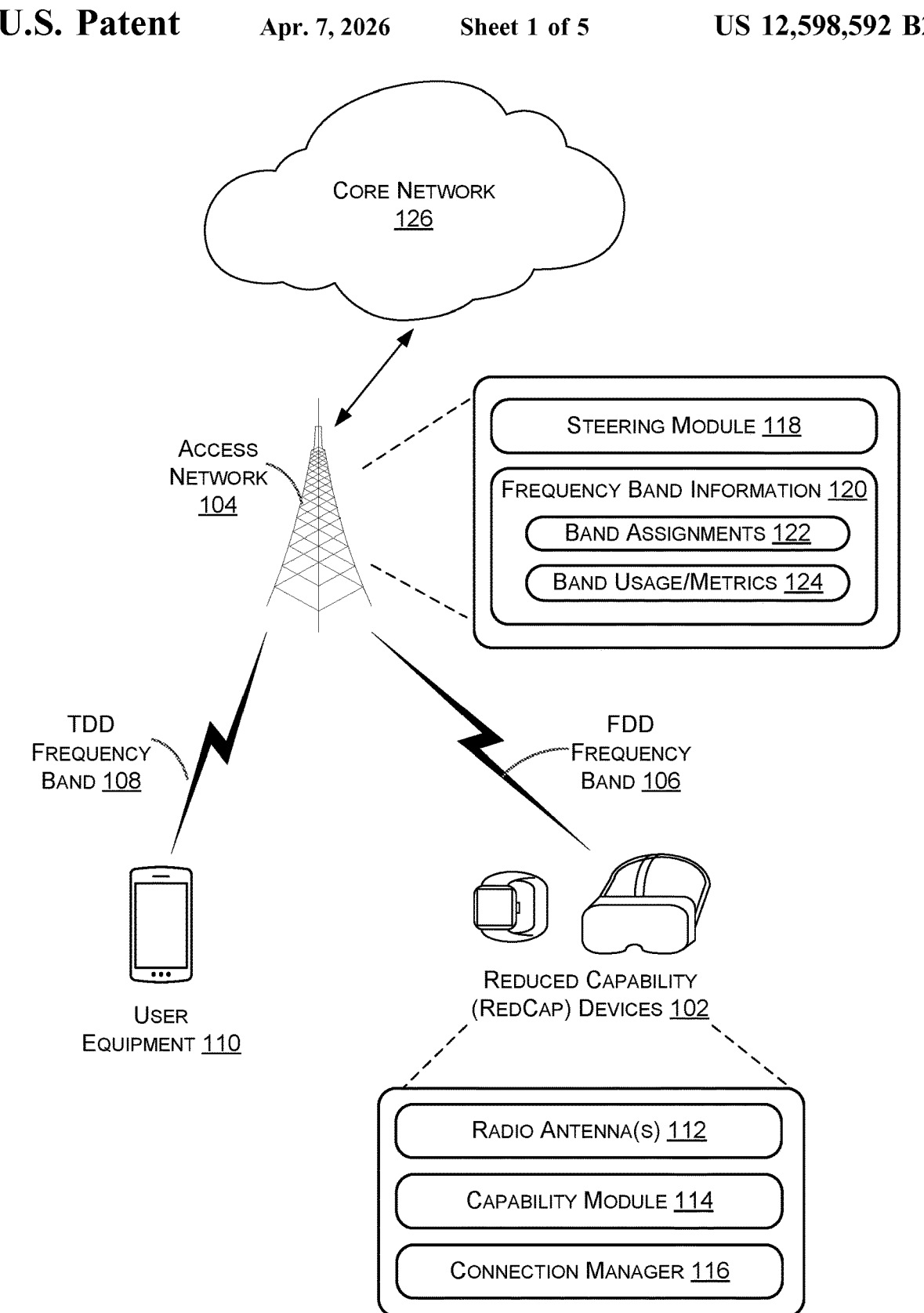
FIG. 1 is a schematic diagram of an illustrative wireless communication network environment in which systems and techniques for reserving FDD frequencies for redcap devices may be implemented, in accordance with examples of the disclosure.

This disclosure is directed in part to systems and techniques for reservation of FDD frequency bands for redcap devices and primary or sole use of those FDD frequency bands by redcap devices. In conventional systems, redcap devices are equipped with radio antenna(s) configured for FDD and TDD and support both FDD and TDD frequency bands. As noted and described further herein, redcap devices are resource constrained, and TDD is less resource efficient than FDD. Redcap devices that only use FDD, or primarily use it, may save resources and, e.g., improve battery life. Also, FDD may give better coverage and better experience to customers using redcap devices and allow TDD to be reserved for other resource intensive uses, such as ultra-broadband.

As used herein a "redcap device"—also referred to as a reduced capability device—is a mobile device meeting the definition of redcap device set forth in 3GPP Release 17. Some characteristics of redcap devices include which lacks New Radio (NR) carrier aggregation (CA) features, which lacks facility for multiuser multiple-input multiple-output (MIMO), and which may cap modulation. Redcap devices are targeted for new applications of Fifth Generation (5G) network and Internet-of-Things (IoT) devices.

In some implementations, a mobile device described herein may include at least one radio antenna configured to communicate as a FDD antenna. The mobile device may determine an indicator that the mobile device is a redcap or FDD-only device and provide the indicator as part of mobile device capabilities to an access network. The mobile device may then establish a connection to the access network via the radio antenna and using a frequency band associated with FDD by the access network. The mobile device may be a redcap device which includes only FDD radio antenna(s) and no TDD radio antenna(s), a redcap device that only supports FDD frequencies and no TDD frequencies, or a redcap device that has both FDD and TDD radio antenna(s) or communicates over both FDD and TDD frequencies but which indicates that it is a redcap device. In some implementations, the mobile device may have redcap application(s) and both TDD and FDD capabilities and may be handled as a redcap device while the redcap application(s) are in use. Further, if the mobile device includes both FDD and TDD capabilities, the mobile device may be steered to primarily use FDD frequency bands but, if and when those FDD frequency bands are congested, the mobile device may instead be handed over to or establish a connection to TDD frequency bands.

In further implementations, an access network within a communication range of a mobile device, such as a redcap device, may receive device capabilities of the mobile device. The device capabilities may indicate that the mobile device is a redcap device or a FDD-only device. The access network may then steer the mobile device to a frequency band associated with FDD based on the device capabilities. The steering may include at least one of cell reselection or handover of the mobile device to the frequency band associated with FDD. Further, in some implementations, the steering comprises determining that the device capabilities indicate that the mobile device is a redcap device or is an FDD-only device, determining which frequency bands associated with FDD are available, and selecting, for the mobile device, one of the frequency bands. Additionally, the access network may schedule redcap devices on the frequency band associated with FDD if another frequency band associated with time division duplex is congested.

FIG. 1 is a schematic diagram of an illustrative wireless communication network environment in which systems and techniques for reserving FDD frequencies for redcap devices may be implemented, in accordance with examples of the disclosure. As illustrated, a redcap device 102 may communicate with an access network 104 using an FDD frequency band 106 of the access network 104. The access network 104 may steer redcap devices 102 to its FDD frequency bands 106 and use its TDD frequency bands 108 for other user equipment (UE(s)) 110. Each redcap device 102 may have at least one radio antenna 112 configured to communicate using FDD, a capability module 114 to determine device capabilities, including an indicator that the redcap device 102 is a redcap device or is an FDD-only device, and a connection manager 116 to establish connections to access networks, such as access network 104, over frequency bands, such as FDD frequency band 106. The access network 104 may include a steering module 118 to steer redcap devices 102 to FDD frequency bands 106 and frequency band information 120 used by the steering module 118, such as band assignments 122 and band usage/metrics 124. The access network 104 may in turn be communicated to a core network 126 of a same wireless communication provider as the access network 104 and may, with the access network 104, provide access to communication services and content.

In various implementations, redcap devices 102 may be any sort of mobile devices fitting the definition of "redcap device" provided herein. Such redcap devices 102 may also or instead include mobile devices that are only configured for FDD, such as those that only have FDD radio antenna(s) or only support FDD frequency bands, and which support redcap applications. As used herein, the term "redcap application" refers to an application which does not use certain features or hardware of the mobile device having the application, those certain features or hardware being absent from/unavailable to a redcap device. Additionally, mobile devices supporting both FDD and TDD and executing a redcap application may be examples of redcap device 102. In some implementations, a redcap device 102 may be one an IoT device, a wearable device, augmented reality/virtual reality goggles or glasses, or a device having a small form factor allowing limited physical resources. An example redcap device 102 is illustrated in greater detail in FIG. 4 and described further herein with regard to that illustration.

In further implementations, access network 104 may be any sort of access network, such as a radio access network, and may have any number of radio antennas, base station equipment, and equipment of other nodes of a wireless communication provider. Example nodes or aspects of such an access network 104 may include a gNode B (gNB)—a 5G base station—which may be standalone or non-standalone and which may or may not support carrier aggregation. The access network 104 further provides connectivity via multiple frequency bands and uses both FDD and TDD for transmitting and receiving via the frequency bands, with FDD used for some bands and TDD used for other bands. An example node of an access network 104 is illustrated in greater detail in FIG. 5 and is described further herein with reference to that figure.

In some implementations, FDD frequency bands 106 and TDD frequency bands 108 may each be any frequency bands capable of transmission or reception by a base station of access network 104. Different characteristics of frequency bands may suit such bands more for one of FDD or TDD. In one example implementation, TDD frequency bands 108 may be used for 5G mobile broadband (mobile BB) and may use, e.g., an n41 frequency band while FDD frequency bands 106 may include, e.g., a 35 MHz band, a 20 MHz band, and a 10 MHz band.

FIG. 1 further illustrates UE(s) 110 connected to TDD frequency bands 108 of the access network 104. Such UE(s) 110 may be any sort of mobile devices. These UE(s) 110 may utilize 5G mobile BB, ultra broadband, or other 5G communication services and, unlike redcap devices 102, may utilize more resource-intensive services such as NR CA or multiuser MIMO. While using TDD frequency bands 108 in some circumstances, the access network 104 may steer the UE(s) 110 to FDD frequency bands 106 when the TDD frequency bands 108 are congested.

In some implementations, the radio antenna(s) 112 of a redcap device 102 may include at least one radio antenna and at least a transmitter and receiver (or at least one transceiver) coupled to the at least one radio antenna. Each radio antenna 112 may have multiple transmitters and receivers (or transceivers), however. Radio antenna(s) 112 may be configured to communicate using FDD, TDD, or both (e.g., radio antenna(s) 112 may be configured to communicate over frequency bands using FDD, frequency bands using TDD, or over both sets of frequency bands). In some implementations, different radio antennas 112 may be used for FDD and TDD. Further, in other implementations, the redcap device 102 may only include radio antenna(s) 112 configured to communicate using FDD.

In various implementations, a redcap device 102 may determine both its indicator that it is a redcap device or FDD-only device and its mobile device capabilities using a capability module 114. The capability module 114 may be part of another component of the redcap device associated with communication services or content services, may be part of logic of the redcap device 102 for managing connections to remote devices and networks, or may be part of a platform/operating system of the redcap device 102.

Determining an indicator of whether the redcap device 102 is a redcap device or an FDD-only device may in turn depend on particulars of the redcap device 102 and its features. In some implementations, the redcap device 102 only includes radio antenna(s) 112 configured to communicate using FDD. In such an implementation, the capability module 114 may determine any one or more of a flag that the redcap device 102 is FDD-only; a list of frequency bands supported by the redcap device 102, the list including only frequency bands associated with FDD; or a flag that the redcap device 102 is a redcap device. If the redcap device 102 is executing redcap application(s), the capability module 114 could also or instead determine a name of one of the application(s) as the indicator. Also, because the mobile device capabilities may include multiple ones of these indicator types for additional purposes, the capability module 114 may determine multiple indicators.

In other implementations, the redcap device 102 may have radio antenna(s) 112 capable of communicating using TDD and FDD, but the capability module 114 may determine an indicator or indicators that state that the that the redcap device 102 only has FDD-supporting radio antenna(s) 112 or a list that only includes frequency bands associated with FDD. To achieve this result, the capability module 114 could include a search mode which only looks for FDD-supporting radio antenna(s) 112 or only looks for frequency bands associated with FDD. Also or instead, as with the FDD-only implementation mentioned herein, the capability module 114 could determine as the indicator either a flag that the redcap device 102 is a redcap device or a name of an executing redcap application. And as noted, multiple ones of these may be included among the mobile device capabilities.

In further implementations, the redcap device 102 may have radio antenna(s) 112 capable of communicating using TDD and FDD, may support frequency bands associated with FDD and TDD, and may indicate either or both of these capabilities as part of the mobile device capabilities. In such implementations, the capability module 114 may determine as the indicator that the redcap device 102 is redcap/FDD-only a flag indicating that the redcap device 102 is a redcap device. Also, or instead, if the redcap device 102 is executing redcap application(s), the capability module 114 could also or instead determine a name of one of the application(s) as the indicator.

Along with determining indicator(s) that the redcap device 102 is a redcap device or a FDD-only device, the capability module 114 determines other mobile device capabilities of the redcap device 102. The mobile device capabilities can include any information about the redcap device 102 or the services it is seeking to use. Such capabilities may include information that may be of use to the access network 104 in establishing and maintaining a connection to the redcap device 102 and in allocating resources for the services sought/used by the redcap device 102.

In various implementations, the connection manager 116 may engage in messaging with the access network 104 to establish a connection with the access network 104. This can include providing the mobile device capabilities, including the indicator that the redcap device 102 is redcap or FDD-only, and receiving instructions to use specific frequency band(s) for uplink and downlink communications. When FDD frequency bands 106 are not congested, or when they are but the redcap device 102 is FDD-only, the instructions may be to use one(s) of the FDD frequency bands 106. When the FDD frequency bands 106 are congested and the redcap device 102 is capable of both FDD and TDD, the instructions may be to use one(s) of the TDD frequency bands 108.

In some implementations, when the redcap device 102 is in idle mode, it can camp on a carrier/frequency band. When the carrier camped on is TDD, the access network 104 can cause the connection manager 116 to reselect for an FDD carrier/frequency band such that the redcap device 102 camps on that carrier/band. Further, when the redcap device 102 is connected to TDD frequency band(s) 108, it may receive instructions to connect to FDD frequency band(s) 106 as part of a handover. In addition to such facilities, the connection manager 116 may also provide periodic measurement reports providing. e.g., signal strengths, packet loss, etc. for frequency bands of access networks detectable by the redcap device 102. Such measurement reports can be provided to the access network 104.

As further illustrated in FIG. 1 and as noted herein, the access network may include a steering module 118. The steering module 118 may be part of a scheduler of a base station of the access network 104, part of layer management logic, or may be a separate module of a node or base station of the access network 104. The steering module 118 may be configured to determine that a mobile device is a redcap device 102 based, e.g., on mobile device capabilities received by the access network 104. Upon determining that a mobile device is a redcap device 102, the steering module 118 may determine which frequency bands of the access network 104 are FDD frequency bands 106 and select one or more of the FDD frequency bands 106 for the mobile device, providing instruction to the mobile device to connect to the access network 104 using the selected frequency band(s) 106. In determining which frequency bands are FDD frequency bands 106, the steering module 118 may access frequency band information 120 of the access network 104, such as band assignment 122. The band assignments 122 may specify which frequency bands use FDD and which frequency bands use TDD. To select among these, the steering module 118 may use usage/metrics 124 of the frequency band information 120. Such usage/metrics 124 may indicate usage or congestion of the various frequency bands and may be updated to reflect, e.g., received measurement reports. The steering module 118 also examines the mobile device capabilities, which may indicate that only a subset of the available FDD frequency bands 106 are supported by the mobile device.

If the available and supported FDD frequency bands 106 are congested and if the mobile device capabilities indicate that the mobile device also supports TDD, then the steering module 118 may cause the access network 104 to provide instructions to the mobile device to connect via TDD frequency band(s) 108.

As discussed further herein, the steering module 118 may determine that a mobile device, such as the redcap device 102, is camped on TDD frequency band(s) 108 in idle mode and may cause the mobile device to perform cell reselection. If the redcap device 102 is connected to the access network 104 via TDD frequency band(s) 108, the steering module 118 may cause the access network 104 to perform a handover process, including instructing the redcap device 102 to connect to the access network 104 via FDD frequency band(s) 106.

In some implementations, when TDD frequency bands 108 are congested, the steering module 118 can cause the UE(s) 110 to connect to the access network 104 using the FDD frequency bands 106.

In various implementations, the core network 126 may be any sort of core network of a wireless communication provider, such as a 5G core network (5GC), a core network of an earlier generation network, or any sort of core network capable of communication with access network 104 and of supporting the communication services and content services used by redcap devices 102 and UE(s) 110. The core network 126 may provide connectivity to other access networks of the wireless communication provider, to other wireless communication providers, and to other types of networks, such as the Internet or other public or private wide area networks (WANs) or local area networks (LANs). The core network 126 may also support network slicing and various network architectures and deployments.

FIG. 2 shows a flow diagram of an illustrative process 200 for determining an indicator that a mobile device is a redcap device or is an FDD-only device, providing that indicator to an access network, and establishing a connection to the access network via an FDD frequency band. The process 200 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 200 is described with reference to the wireless network environment of FIG. 1, however other environments may also be used.

At block 202, a mobile device may camp on a frequency band associated with FDD while in idle mode. The mobile device may be one of an Internet-of-Things device, a wearable device, virtual reality/augmented reality goggles or glasses, or a device having a small form factor allowing limited physical resources. The mobile device may also include at least radio antenna configured to communicate as a FDD antenna. The same radio antenna or a second radio antenna may also be configured to communicate as a TDD antenna. Alternatively, only radio antenna(s) configured to communicate as FDD antenna(s) may be included on the mobile device.

At block 204, the mobile device may determine an indicator that the mobile device is a redcap or FDD-only device. The indicator may be one of a flag indicating that the mobile device only has FDD antenna(s), frequency bands supported by the mobile device, the frequency bands being associated with FDD by an access network (e.g., the access network camped on by the mobile device or an adjacent access network), an identifier of a redcap application, or a flag indicating that the mobile device is a redcap device. In some implementations, at block 206, determining the indicator may include determining that the mobile device has an FDD antenna and a TDD antenna but determining, as the indicator, a flag indicating that the mobile device only has FDD antenna(s). In further implementations, at block 208, determining the indicator may include determining that the mobile device supports frequency bands associated with FDD and frequency bands associated with TDD but determining, as the indicator, only the frequency bands associated with FDD. In yet further implementations, at block 210, determining the indicator may include determining that the mobile device includes FDD and TDD antennas or supports FDD or TDD frequency bands but is a redcap device or has an active or executing redcap application and determining, as the indicator, a name of the redcap application or a redcap flag.

At block 212, the mobile device may provide mobile device capabilities, including the indicator, to the access network. In some implementations, as noted, the device capabilities indicate that the mobile device is a redcap device or is using a redcap application and further indicate (A) that the mobile device has both an FDD antenna and a TDD antenna or (B) that the mobile device supports frequency bands associated with FDD and frequency bands associated with TDD.

At block 214, the mobile device may establish a connection to the access network via a radio antenna of the mobile device and using a frequency band associated with FDD by the access network. In some implementations, establishing the connection to the access network comprises establishing, at block 216, the connection to the access network using the frequency band associated with FDD when the frequency band is not congested and, when the frequency band is congested, establishing, at block 218, the connection to the access network via the TDD antenna and using a frequency band associated with TDD by the access network.

FIG. 3 shows a flow diagram of an illustrative process 300 for receiving an indicator that a mobile device is a redcap device or an FDD-only device and steering that mobile device to an FDD frequency band. The process 300 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 300 is described with reference to the wireless network environment of FIG. 1, however other environments may also be used.

At block 302, an access network may receive device capabilities of a mobile device, the device capabilities indicating that the mobile device is a redcap device or a FDD-only device. The device capabilities may include one of a flag indicating that the mobile device only has FDD antenna(s), frequency bands supported by the mobile device, an identifier of a redcap application, or a flag indicating that the mobile device is a redcap device.

At block 304, based on the device capabilities, the access network may steer the mobile device to a frequency band associated with FDD. In some implementations, the steering comprises at least one of cell reselection or handover of the mobile device to the frequency band associated with FDD. In further implementations, the steering may include determining, at block 306, that the device capabilities indicate that the mobile device is a redcap device or is an FDD-only device; determining, at block 308, which frequency bands associated with FDD are available; and selecting for the mobile device, at block 310, one of the frequency bands.

At block 312, the access network may schedule non-redcap devices on the frequency band associated with FDD if another frequency band associated with TDD is congested.

Figure 4:
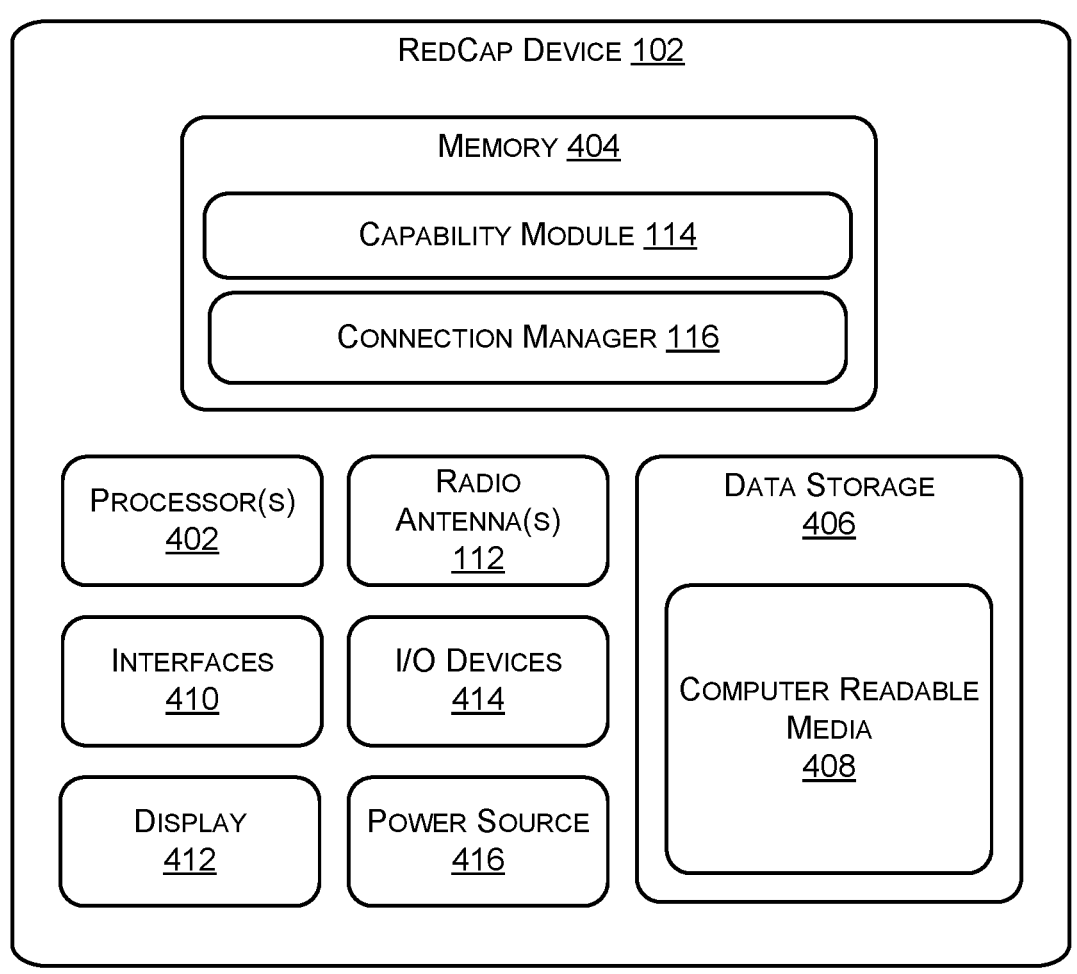
FIG. 4 is a schematic diagram of illustrative components in an example redcap device that is configured to determine and provide indicia that the redcap device is a redcap device or an FDD-only device and that connects to an access network via FDD frequency bands.

FIG. 4 is an example of a redcap device, such as redcap device 102, for use with the systems and methods disclosed herein, in accordance with some examples of the present disclosure. The redcap device 102 may include one or more processors 402, radio antenna(s) 112, a memory 404, and a data storage 406. The data storage 406 may include a computer readable media 408 in the form of memory and/or cache. This computer-readable media may be an example of a non-transitory computer storage medium. The processor(s) 402 may be configured to execute instructions, which can be stored in the computer readable media 408 and/or in other computer readable media accessible to the processor(s) 402. In some configurations, the processor(s) 402 is a Central Processing Unit (CPU), a Graphics Processing Unit (GPU), or both CPU and GPU, or any other sort of processing unit. The radio antenna(s) are described in further detail herein.

The memory 404 may be implemented within, or separate from, the data storage 406 and/or the computer readable media 408. The memory 404 may include any available physical media accessible by a computing device to implement the instructions stored thereon. For example, the memory 404 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the redcap device 102.

The memory 404 can store several modules, such as instructions, data stores, and so forth that are configured to execute on the processor(s) 402. For instance, the memory 404 may store a capability module 114 and a connection manager 116, both described herein in greater detail. In configurations, the memory 404 may also include one or more operating systems and/or one or more third-party applications that provide additional functionality to the redcap device 102.

Although not all illustrated in FIG. 4, the redcap device 102 may also comprise various other components, e.g., one or more network interfaces 410, an audio interface, a display 412, a keypad or keyboard, one or more input/output devices 414, a power source 416 (e.g., a battery), a charging unit, etc.

Figure 5:
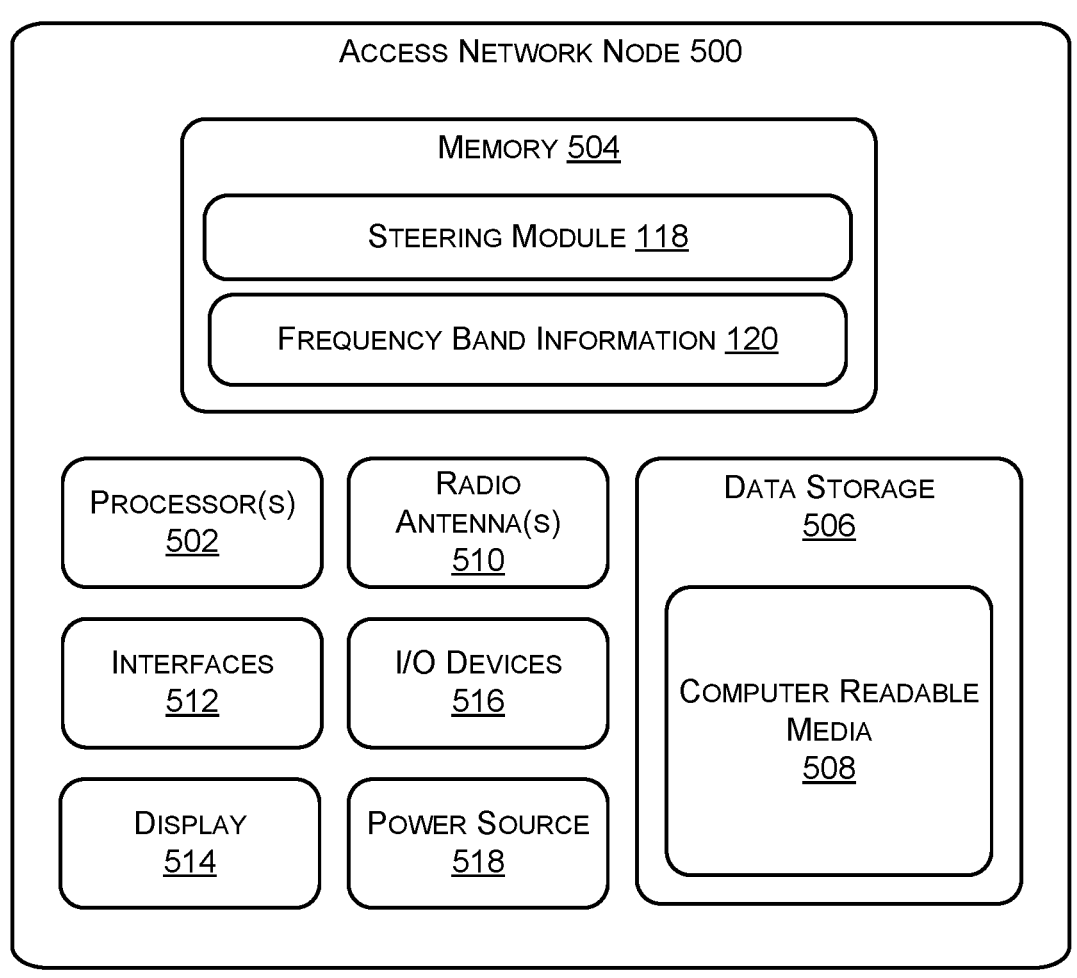
FIG. 5 is a schematic diagram of illustrative components in an example access network node that is configured to steer redcap devices to FDD frequency bands based on frequency band information gathered by the access network.

FIG. 5 is an example of a node of an access network 104, such as access network node 500, for use with the systems and methods disclosed herein, in accordance with some examples of the present disclosure. The access network node 500 may include one or more processors 502, memory 504, and a data storage 506. The data storage 506 may include a computer readable media 508 in the form of memory and/or cache. This computer-readable media may include a non-transitory computer-readable media. The processor(s) 502 may be configured to execute instructions, which can be stored in the computer readable media 508 and/or in other computer readable media accessible to the processor(s) 502. In some configurations, the processor(s) 502 is a Central Processing Unit (CPU), a Graphics Processing Unit (GPU), or both CPU and GPU, or any other sort of processing unit.

The memory 504 may be implemented within, or separate from, the data storage 506 and/or the computer readable media 508. The memory 504 may include any available physical media accessible by a computing device to implement the instructions stored thereon. For example, the memory 504 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the access network node 500.

The memory 504 can store several modules, such as instructions, data stores, and so forth that are configured to execute on the processor(s) 502. For instance, the memory 504 may store a steering module 118 and frequency band information 120, both of which are described further herein. In configurations, the memory 504 may also include one or more operating systems and/or one or more third-party applications that provide additional functionality to the access network node 500.

Although not all illustrated in FIG. 5, the access network node 500 may also comprise various other components, e.g., radio antenna(s) 510, one or more network interfaces 512, a display 514, a keypad or keyboard, one or more input/output devices 516, an audio interface, a power source 518 (e.g., a battery), a charging unit, etc.

Although features and/or methodological acts are described above, it is to be understood that the appended claims are not necessarily limited to those features or acts. Rather, the features and acts described above are disclosed as example forms of implementing the claims.

What is claimed is:

1. A mobile device comprising:
a processor;
a frequency division duplex (FDD) antenna;
a time division duplex (TDD) antenna; and
programming instructions that, when executed by the processor, cause the mobile device to perform operations including:
determining an indicator that the mobile device is a reduced-capability (redcap) or FDD-only device;
determining that the mobile device has the FDD antenna and the TDD antenna but determining, as at least part of the indicator, a flag indicating that the mobile device only has FDD antenna(s);
providing mobile device capabilities, including the indicator, to an access network; and
establishing a connection to the access network via the FDD antenna and using a frequency band associated with FDD by the access network.

2. The mobile device of claim 1, wherein the indicator further comprises:
frequency bands supported by the mobile device, the frequency bands being associated with FDD by the access network,
an identifier of a redcap application, or
a flag indicating that the mobile device is a redcap device.

3. The mobile device of claim 1, wherein the FDD antenna and TDD antenna comprise a single radio antenna that is configured as both the FDD antenna and the TDD antenna.

4. The mobile device of claim 3, wherein the mobile device capabilities indicate that the mobile device is a redcap device or is using a redcap application and further indicate (A) that the mobile device has both an FDD antenna and a TDD antenna or (B) that the mobile device supports frequency bands associated with FDD and frequency bands associated with TDD.

5. The mobile device of claim 4, wherein establishing the connection to the access network comprises establishing the connection to the access network using the frequency band associated with FDD when the frequency band is not congested and, when the frequency band is congested, establishing the connection to the access network via the TDD antenna and using a frequency band associated with TDD by the access network.

6. The mobile device of claim 3, wherein determining the indicator further comprises:
determining that the mobile device supports frequency bands associated with FDD and frequency bands associated with TDD but determining, as the indicator, only the frequency bands associated with FDD.

7. The mobile device of claim 1, wherein the establishing comprises camping on a frequency band associated with FDD while in idle mode.

8. The mobile device of claim 1, wherein the mobile device is one of an Internet-of-Things device, a wearable device, virtual reality/augmented reality goggles or glasses, or a device having a small form factor allowing limited physical resources.

9. A method comprising:
determining, by a mobile device, an indicator that the mobile device is a reduced-capability (redcap) or frequency division duplex (FDD)-only device;
determining that the mobile device has an FDD antenna and a TDD antenna but determining, as at least part of the indicator, a flag indicating that the mobile device only has FDD antenna(s);
providing, by the mobile device, mobile device capabilities, including the indicator, to an access network; and
establishing, by the mobile device, a connection to the access network via a radio antenna of the mobile device and using a frequency band associated with FDD by the access network, wherein the radio antenna is configured to communicate as an FDD antenna.

10. The method of claim 9, wherein the indicator further comprises:
frequency bands supported by the mobile device, the frequency bands being associated with FDD by the access network,
an identifier of a redcap application, or
a flag indicating that the mobile device is a redcap device.

11. The method of claim 9, wherein the mobile device further includes a time division duplex (TDD) antenna and the TDD antenna is:
the radio antenna, the radio antenna being configured as both an FDD antenna and a TDD antenna; or

a second radio antenna, the second radio antenna being configured to communicate as the TDD antenna.

12. The method of claim 11, wherein the mobile device capabilities indicate that the mobile device is a redcap device or is using a redcap application and further indicate (A) that the mobile device has both an FDD antenna and a TDD antenna or (B) that the mobile device supports frequency bands associated with FDD and frequency bands associated with TDD.

13. The method of claim 12, wherein establishing the connection to the access network comprises establishing the connection to the access network using the frequency band associated with FDD when the frequency band is not congested and, when the frequency band is congested, establishing the connection to the access network via the TDD antenna and using a frequency band associated with TDD by the access network.

14. The method of claim 9, wherein the establishing comprises camping on a frequency band associated with FDD while in idle mode.

15. A non-transitory storage medium having programming instructions stored thereon that, when executed by one or more processors of a mobile device, cause the mobile device to perform operations comprising:

determining an indicator that the mobile device is a reduced-capability (redcap) or frequency division duplex (FDD)-only device;

determining that the mobile device has an FDD antenna and a TDD antenna but determining, as at least part of the indicator, a flag indicating that the mobile device only has FDD antenna(s);

providing mobile device capabilities, including the indicator, to an access network; and establishing a connection to the access network via a radio antenna of the mobile device and using a frequency band associated with FDD by the access network, wherein the radio antenna is configured to communicate as an FDD antenna.

16. The non-transitory storage medium of claim 15, wherein the indicator further comprises:

frequency bands supported by the mobile device, the frequency bands being associated with FDD by the access network, an identifier of a redcap application, or a flag indicating that the mobile device is a redcap device.

17. The non-transitory storage medium of claim 15, wherein the mobile device further includes a time division duplex (TDD) antenna and the TDD antenna is:

the radio antenna, the radio antenna being configured as both an FDD antenna and a TDD antenna; or a second radio antenna, the second radio antenna being configured to communicate as the TDD antenna.

18. The non-transitory storage medium of claim 17, wherein the mobile device capabilities indicate that the mobile device is a redcap device or is using a redcap application and further indicate (A) that the mobile device has both an FDD antenna and a TDD antenna or (B) that the mobile device supports frequency bands associated with FDD and frequency bands associated with TDD.

19. The non-transitory storage medium of claim 18, wherein establishing the connection to the access network comprises establishing the connection to the access network using the frequency band associated with FDD when the frequency band is not congested and, when the frequency band is congested, establishing the connection to the access network via the TDD antenna and using a frequency band associated with TDD by the access network.

* * * * *